(12) United States Patent
Miller et al.

(10) Patent No.: US 8,197,346 B2
(45) Date of Patent: Jun. 12, 2012

(54) SHUTTLE VENT VALVE

(75) Inventors: Michael James Miller, White Lake, MI (US); Eric James LaMothe, Goodrich, MI (US); Richard A. Compau, Holly, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 256 days.

(21) Appl. No.: 12/522,808

(22) PCT Filed: Jan. 12, 2007

(86) PCT No.: PCT/US2007/060476
§ 371 (c)(1),
(2), (4) Date: Jul. 10, 2009

(87) PCT Pub. No.: WO2008/085525
PCT Pub. Date: Jul. 17, 2008

(65) Prior Publication Data
US 2010/0120542 A1 May 13, 2010

(51) Int. Cl.
*F16D 3/223* (2011.01)
(52) U.S. Cl. .......................................... 464/17; 464/906
(58) Field of Classification Search ............... 464/17, 464/11, 15, 905, 906; 137/854, 855, 493, 137/493.9, 198, 199; 277/634, 635, 552, 277/929, 928
See application file for complete search history.

(56) References Cited

U.S. PATENT DOCUMENTS

| 2,571,893 | A | * | 10/1951 | Kendall | 429/54 |
| 2,769,457 | A | * | 11/1956 | Wittenberg | 137/512 |
| 3,454,182 | A | | 7/1969 | Morton | |
| 4,102,472 | A | | 7/1978 | Sloan | |
| 4,401,224 | A | * | 8/1983 | Alonso | 215/11.5 |
| 4,508,522 | A | | 4/1985 | Numazawa et al. | |
| 4,658,979 | A | * | 4/1987 | Mietz et al. | 220/203.13 |
| 5,027,784 | A | * | 7/1991 | Osawa et al. | 123/572 |
| 5,941,391 | A | * | 8/1999 | Jury | 206/524.8 |
| 5,944,211 | A | * | 8/1999 | Woodnorth et al. | 220/203.13 |
| 6,138,778 | A | * | 10/2000 | Price et al. | 175/228 |
| 6,299,177 | B1 | * | 10/2001 | Rehberg et al. | 277/634 |
| 6,530,843 | B2 | | 3/2003 | Miller | |
| 6,540,616 | B2 | | 4/2003 | Miller | |
| 6,699,129 | B2 | | 3/2004 | Wang | |
| 6,722,991 | B2 | * | 4/2004 | Chrobak et al. | 464/17 |
| 6,793,581 | B2 | * | 9/2004 | Meyer et al. | 464/15 |

(Continued)

FOREIGN PATENT DOCUMENTS

JP 2003040321 A * 2/2003

(Continued)

*Primary Examiner* — Gregory Binda
*Assistant Examiner* — Matthieu Setliff
(74) *Attorney, Agent, or Firm* — Jennifer M. Brumbaugh; Mick A. Nylander; Rader, Fishman & Grauer PLLC

(57) ABSTRACT

A vent valve for a constant velocity joint is disclosed. The vent valve may generally include a body disposed in a bore of the cover which is axially movable in the bore and allows fluid flow through the bore, a first umbrella portion associated with a side of the body which defines a first gap between a first surface of the cover and the first umbrella portion, and a second umbrella portion associated with an opposite side of the body which defines a second gap between a second surface of the cover and the second umbrella portion.

18 Claims, 3 Drawing Sheets

U.S. PATENT DOCUMENTS

| | | |
|---|---|---|
| 6,830,074 B2 | 12/2004 | Wang |
| 7,048,136 B2 * | 5/2006 | Havens et al. ............... 220/212 |
| 7,204,760 B2 * | 4/2007 | Wang ............................ 464/17 |
| 7,243,676 B2 * | 7/2007 | Bailey ..................... 137/512.15 |
| 2005/0101390 A1 | 5/2005 | Wang |

FOREIGN PATENT DOCUMENTS

JP        2010034244 A  *  2/2010

* cited by examiner

SHUTTLE VENT VALVE

TECHNICAL FIELD

Described herein is a constant velocity joint and an improved vent and venting system therefore.

BACKGROUND ART

Constant velocity joints (CV joints) are common components in vehicles. Constant velocity joints are often employed where transmission of a constant velocity rotary motion is desired or required. CV joints are typically greased or otherwise lubricated for the life of the component. The joints are preferably sealed to retain the grease or lubricant inside the joint while keeping contaminants and foreign matter, such as water and dirt, out of the joint. Moreover, a sealing boot, which may be made of rubber, thermoplastic, silicone material, or the like usually encloses portions of the CV joints (such as an open end). Additionally, the opposite end of the joint may also be enclosed with a grease cover to close off the CV joint from contaminants.

During operation, a CV joint may create excess internal pressures in the inner chamber of the joint. In such instances, it is often desirable to vent pressurized gases from the chamber of the joint to the outer atmosphere to reduce the internal temperature of the joint. This function can prevent undesirable pressure build-up during operation of the joint that could damage or compromise components such as the sealing boot. Consequently, many CV joints include a vent.

Vents may be provided in a grease cover of a CV joint, as an alternative or in addition to one or more vents in a sealing boot. Vents provided in a grease cover are typically effective for venting gases from the interior of the joint during operation of the CV joint. However, grease cover vents also may allow grease or other lubricants to escape the joint interior when gases are vented, particularly during assembly of the CV joint. Hydraulic pressure is typically created within the joint interior when the shaft is installed into the joint. The hydraulic pressure may cause venting of gases from within the joint interior through the grease cover vent and may additionally force some of the grease contained within the joint interior out the vent also.

Accordingly, there is a need in the art for a grease cover vent for a CV joint which properly vents the joint chamber with the external atmosphere while also offering increased resistance to expulsion of grease from the joint chamber, especially during assembly of the CV joint.

DISCLOSURE OF THE INVENTION

A CV joint includes a joint chamber, a cover of the joint chamber, which has a bore, and a vent valve disposed in the bore. The vent valve includes a body disposed in the bore of the cover which generally allows fluid flow through the bore, a first umbrella portion associated with a side of the body which defines a gap between a surface of the grease cover and the first umbrella portion, and a second umbrella portion associated with an opposite side of the body which defines a second gap between an opposite surface of the grease cover and the second umbrella portion.

BRIEF DESCRIPTION OF DRAWINGS

FIG. 4B is a partial section view of a shuttle vent valve taken along line 4B-4B of

FIG. 4A.

DETAILED DESCRIPTION

Figure 1:
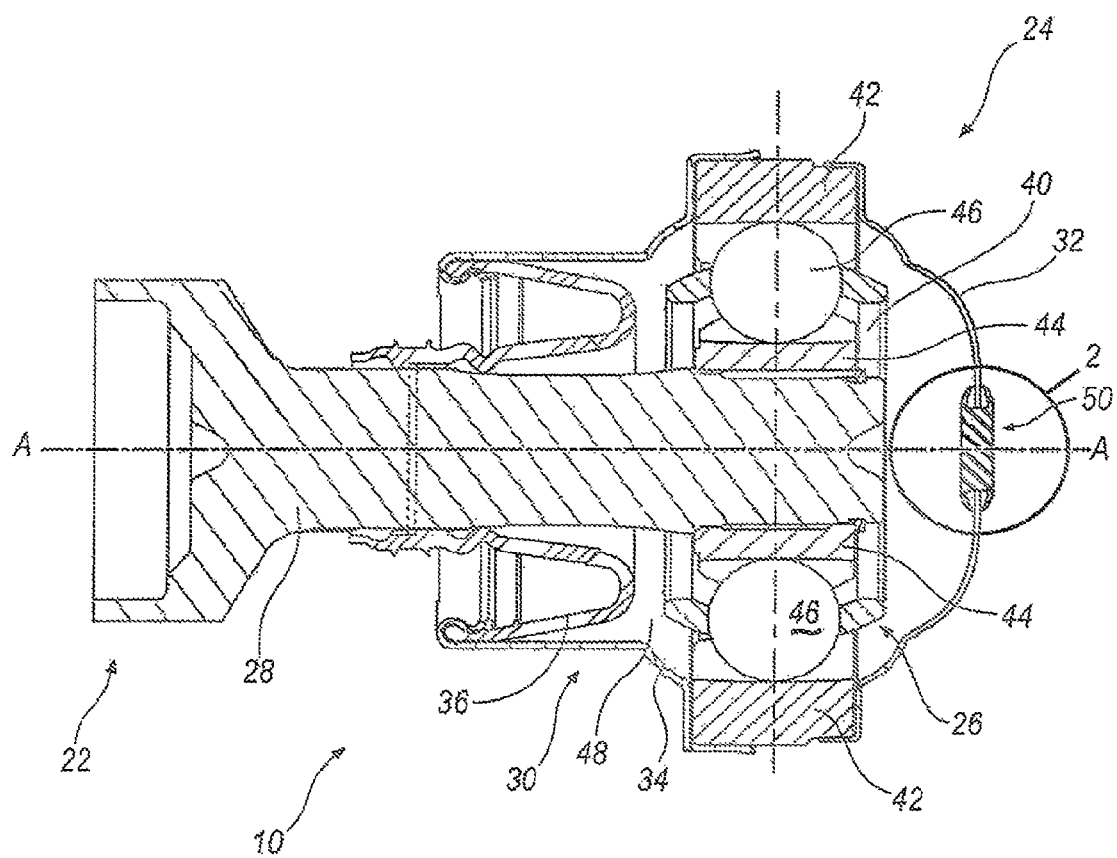
FIG. 1 is a partial sectional view of a constant velocity joint.

Referring to the drawings, a constant velocity joint 10 is shown. It should be noted that all types of CV joints, such as plunging tripods, a fixed tripod, etc., may be used with the present invention. One of ordinary skill in the art will recognize the advantages realized by the invention in substantially all types of constant velocity joints, and, therefore the invention should not be limited to the illustrated embodiments.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Referring to FIG. 1, the CV joint 10 having a central axis A-A is illustrated according to an embodiment. CV joint 10 includes driven end 22 and a driving end 24. CV joint 10 further includes a joint assembly 26 coupled to a shaft 28 with a boot cover assembly 30 connected therebetween. CV joint 10 may further include a grease cover 32 that seals the driving end 24. Grease cover 32 may include a shuttle vent 50, as will be described further below. Boot cover assembly 30 may include a metal cover 34 and a flexible CV joint boot 36. A portion of metal cover 34 is crimped onto boot 36 for attachment thereto. Boot cover assembly 30 and the grease cover 32 protect the moving parts of CV joint 10 during operation by retaining the grease or lubricant inside the joint and keeping contaminants and foreign matter, such as water and dirt, out of the joint assembly 26.

Joint assembly 26 includes a cage 40, a first rotational member or outer race 42, a second rotational member or inner race 44, and a plurality of balls 46. Cage 40 retains balls 46 between the first rotational member 42 and the second rotational member 44 in a generally equally spaced circumferential orientation. Shaft 28 is splined to second rotational member 44 to allow axial movement therebetween.

Collectively, at least the shaft 28, boot cover assembly 30, first rotational member 42, and grease cover 32 form a joint chamber 48. Joint chamber 48 contains grease or other lubricants (not shown) for lubrication between cage 40, first rotational member 42, second rotational member 44, and balls 46. During operation of CV joint 10, lubricant contained within joint chamber 48 will generally be drawn outwards towards first rotational member 42 by centrifugal forces generated by the spinning of CV joint 10. This results in the formation of a "grease-free zone" around a center portion of joint chamber 48, typically including at least shaft 28 and shuttle vent valve 50. The size of the grease-free zone will depend partly on the amount of lubricant contained within joint chamber 48.

Figure 2:
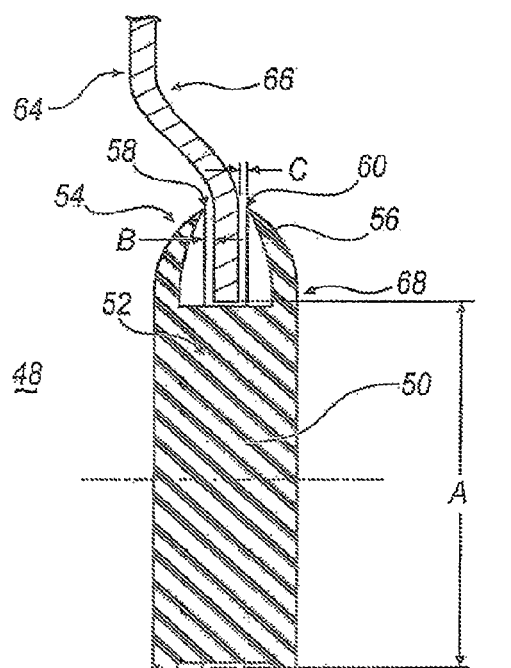
FIG. 2 is a partial section view of a shuttle vent valve, taken from encircled area 2 of FIG. 1.

Turning now to FIG. 2, shuttle vent valve 50 is illustrated in further detail, according to an embodiment. Shuttle vent valve 50 is disposed in a hole or bore 68 provided in grease cover 32. Bore 68 is preferably located inside a grease-free zone of CV joint 10, thereby generally preventing grease from accumulating near bore 68 and shuttle vent valve 50 during operation of CV joint 10. Shuttle vent valve 50 may generally include a body portion 52, an inner or first umbrella portion 54 joined to a first side of body portion 52, and an outer or second umbrella portion 56 joined to an opposite side of body portion 52. Shuttle vent 50 may be formed of any known material. However, shuttle vent valve 50 is preferably formed of a material, which provides desirable flexibility characteristics, e.g., to allow deflection of shuttle vent valve 50 during insertion into bore 68. Examples include a variety of materials which may be injection molded to integrally form shuttle vent valve 50, such as a low to medium temperature polychloroprene materials, higher temperature Nitrile Butadiene Rubber (NBR) materials, Hydrogenated Nitrile Butadiene Rubber (HNBR) materials, and higher temperature silicone or flourosilicone materials.

Body portion 52 may have a generally cylindrical shape with a diameter that provides a clearance fit with bore 68. For example bore 68 is shown as being defined by a diameter A. Body 52 preferably has a diameter slightly less than A thereby allowing fluid flow between joint chamber 48 and the external atmosphere 70. The clearance fit between body 52 and bore 68 also allows body 52 to move axially within bore 68 in response to a pressure differential between joint chamber 48 and the external atmosphere 70.

Inner umbrella portion 54 has a generally umbrella-like shape, which defines an inner lip 58 around the periphery of inner umbrella portion 54. Inner lip 58 cooperates with an interior or first surface 64 of grease cover 32 to define a gap B therebetween. Gap B is preferably large enough to generally allow fluid flow between joint chamber 48 and bore 68, while not so large as to freely allow grease to flow from joint chamber 48 to bore 68. Inner lip 58 at least partially prevents grease or other lubricants contained within joint chamber 48 from being exhausted during venting of joint chamber 48.

Outer umbrella portion 56 may generally mirror inner umbrella portion 54. In the embodiment shown in FIG. 2, outer umbrella portion 56 also has a generally umbrella-like shape and defines an outer lip 60 around the periphery of outer umbrella portion 56. Outer lip 60 cooperates with an outer or second surface 66 of grease cover 32 to define a gap C therebetween. Gap C is preferably large enough to generally freely allow fluid flow between bore 68 and the external atmosphere 70, while not so large as to freely allow grease to flow from bore 68 to the external atmosphere 70, or to freely allow entry of external contaminants such as water into joint chamber 48. Accordingly, venting of gases within joint chamber 48 is generally allowed through gaps B and C by shuttle vent valve 50 during normal operation of CV joint 10. Sealing lips 58, 60 minimize expulsion of grease from joint chamber 48 and entry of external contaminants by at least partially obstructing flow of grease through gap B, and further may prevent expulsion of grease entirely by engaging inner and outer surfaces 64, 66 when a pressure differential between joint chamber 48 and the external atmosphere 70 occurs. Further, during operation of CV joint 10, grease and other lubricants will preferably be drawn towards a grease-free zone and away from shuttle vent valve 50 minimizing an amount of grease or lubricants which may reach sealing lips 58, 60.

During the assembly or operation of CV joint 10, pressure within joint chamber 48 may increase. For example, during assembly of CV joint 10, the insertion of shaft 28 into CV joint 10 may increase an internal pressure of joint chamber 48. Further, during operation of CV joint 10 the operating temperature of joint chamber 48 may increase as a result of friction between various joint internals, despite the presence of grease or other lubricants. Accordingly, gases within joint chamber 48 may expand during operation, thereby building pressure within joint chamber 48. As pressure builds within joint chamber 48, either during operation of CV joint 10 or during assembly of CV joint 10, gas expands and may vent through shuttle vent 50. Gas may generally flow from joint chamber 48 through gap B, bore 68 and gap C to the external atmosphere 70 when pressure within joint chamber 48 increases above that of the external atmosphere 70. Further, a pressure differential between joint chamber 48 and the external atmosphere may apply a force to the inner umbrella portion 54 of shuttle vent valve 50 tending to push shuttle vent valve 50 axially toward the external atmosphere 70. This movement allows sealing lip 58 to engage inner surface 64 of joint chamber 48, thereby at least partially preventing grease from flowing out of joint chamber 48. Inner umbrella portion 54 may remain engaged with inner surface 64 of grease cover 32 at least until such time that pressure decreases within joint chamber 48. For example, upon cool down of CV joint 10, pressure within joint chamber 48 may decrease below that of the external atmosphere 70, such that inner umbrella portion 54 disengages from inner surface 64, and shuttle vent valve 50 slides axially toward joint chamber 48. Outer umbrella portion 56 may subsequently engage outer surface 66 of grease cover 32, thereby advantageously preventing external contaminants such as water from entering joint chamber 48.

Figure 3:
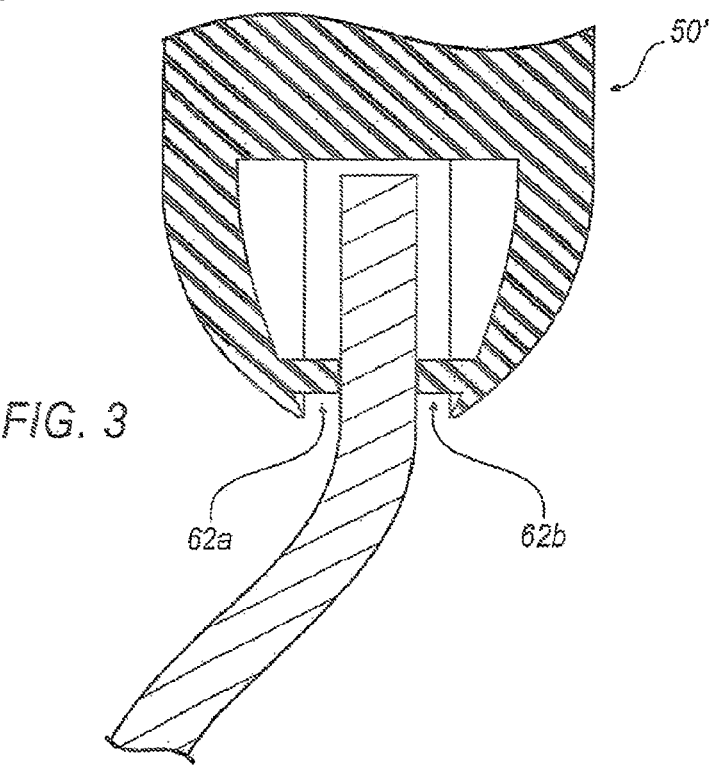
FIG. 3 is a close-up view of a portion of a shuttle vent valve.

Turning now to FIG. 3, an alternative embodiment of shuttle vent valve 50' is shown having an optional feature. Shuttle vent valve 50' is shown with at least one inner foot portion 62a, disposed on a portion of inner umbrella portion 54. Shuttle vent valve 50' is further shown with at least one outer foot portion 62b disposed on a portion of outer umbrella portion 56. Umbrella portions 54 and 56 may each have a plurality of foot portions 62a, 62b generally positioned around the periphery of inner and outer umbrella portions 54, 56. The foot portions 62a,b generally space inner and outer umbrella portions 54, 56 away from inner and outer surfaces 64, 66 of grease cover 32, respectively. Inner and outer foot portions 62a,b may thereby decrease a total surface area engagement between inner and outer umbrella portions 54, 56 and inner and outer surfaces 64, 66, when a pressure differential between joint chamber 48 and the external atmosphere 70 occurs. Accordingly, inner and outer foot portions 62a,b may generally decrease a resistance of sealing lips 58, 60 to disengage inner and outer surfaces 64, 66 during transition of joint chamber 48 from a positive/negative pressure differential to a negative/positive pressure differential with external atmosphere 70, respectively. For example, such transitions in pressure differential may occur during startup or cool down of CV joint 10. The inclusion and quantity of foot portions 62a,b with shuttle vent valve 50' is optional and not required for operation of shuttle vent valves 50 or 50' in the CV joint 10.

Figure 4A:
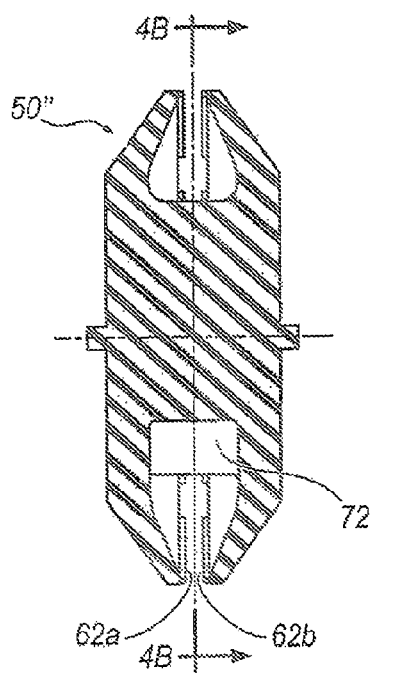
FIG. 4A is a partial section view of a shuttle vent valve.
Figure 4B:
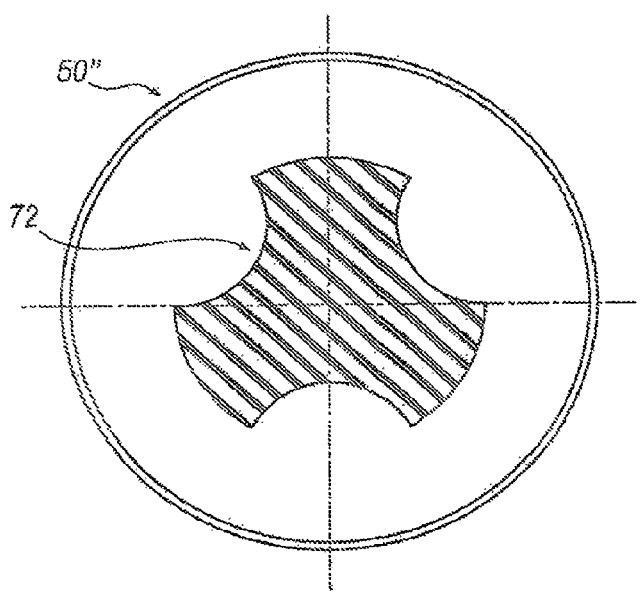

Turning now to FIGS. 4A and 4B, an alternative embodiment of shuttle vent valve 50" is shown. Shuttle vent valve 50" has an interference fit between body 52 and bore 68 of grease cap 32. To allow fluid flow between joint chamber 48 and the external atmosphere 70, the body 52 includes channel 72. Additionally, channel 72 may decrease a total friction between shuttle vent valve 50" and bore 68 by reducing the surface area of shuttle vent valve 50" engaged with bore 68, thereby decreasing resistance of body 52 to axial sliding within bore 68, and increasing sensitivity of shuttle vent valve 50" to pressure variations between joint chamber 48 and the external atmosphere 70. Again, although shuttle vent valve 50" is illustrated in FIG. 4A as having foot portions 62a,b, the inclusion and quantity of foot portions 62a,b is optional.

Shuttle vent valves 50, 50' and 50" therefore provide a mechanism for venting CV joint 10 during operation or assembly of CV joint 10, while also generally preventing expulsion of grease or other lubricants from joint chamber 48, and further inhibiting intrusion of external contaminants into joint chamber 48.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A grease cover assembly for a constant velocity joint, comprising:
    a cover defining a bore; and
    a vent valve received within the bore, the vent valve including:
    a body disposed in the bore, the body sized so as to be axially movable in the bore and generally allowing fluid flow through the bore;
    a first umbrella portion associated with a side of said body, said first umbrella portion serving to define a first gap between a first surface of the grease cover and said first umbrella portion, wherein said first umbrella portion defines a first sealing lip defining said first gap between said first surface of said grease cover and said first umbrella portion; and
    a second umbrella portion associated with an opposite side of said body, said second umbrella portion serving to define a second gap between a second surface of the grease cover and said second umbrella portion, wherein said second umbrella portion defines a second sealing lip defining said second gap between said second surface of said grease cover and said second umbrella portion, said second sealing lip extending about a periphery of the second umbrella portion, said second sealing lip configured to selectively engage said second surface of said cover and wherein said second sealing lip is configured to substantially prevent a liquid from flowing through the bore when the second sealing lip is engaged with the second surface of the cover.

2. The grease cover assembly of claim 1, wherein said first umbrella portion at least partially prevents grease from flowing through the bore.

3. The grease cover assembly of claim 1, wherein said second umbrella portion at least partially prevents at least one of grease and an external contaminant from flowing through the bore.

4. The grease cover assembly of claim 1, further comprising at least one foot portion disposed on said first umbrella portion, said at least one foot portion operable to space said first umbrella portion away from said first surface of the grease cover to define said first gap.

5. The grease cover assembly of claim 1, further comprising at least one foot portion disposed on said second umbrella portion, said at least one foot portion operable to space said second umbrella portion away from said second surface of the grease cover to define said second gap.

6. The grease cover assembly of claim 1, wherein said body has a maximum diameter defining a clearance fit with the bore.

7. The grease cover assembly of claim 1, wherein said body defines at least one channel disposed between the first and second surfaces of the grease cover, said at least one channel allowing fluid flow therebetween.

8. The grease cover assembly of claim 1, wherein the grease cover defines an axial thickness through the bore; and
    wherein the body spaces apart the first and second sealing lips by an axial distance, the axial distance greater than the axial thickness of the grease cover such that axial translation of the body within the bore selectively places one of the first and second sealing lips in contact with said grease cover while the other of the first and second sealing lips is spaced apart from the grease cover.

9. The grease cover assembly of claim 1, wherein said second sealing lip is configured to engage said second surface of said cover about substantially an entire portion of said periphery of said second umbrella portion.

10. A constant velocity joint, comprising:
    a joint chamber;
    a cover secured to said joint chamber, said cover defining a bore; and
    a vent valve disposed in said bore, said vent valve including:
    a body disposed in said bore, the body sized so as to be axially movable in the bore and generally allowing fluid flow through said bore;
    an inner umbrella portion associated with said body, said inner umbrella portion serving to define a first gap between an interior surface of said cover and said inner umbrella portion;
    further comprising at least one foot portion disposed on said inner umbrella portion, said foot portion operable to space said inner umbrella portion away from said interior surface to define said first gap; and
    an outer umbrella portion associated with said body, said outer umbrella portion serving to define a second gap between an outer surface of said cover and said outer umbrella portion, wherein said outer umbrella portion defines an outer sealing lip defining said second gap, said outer sealing lip extending about a periphery of the second umbrella portion, said outer sealing lip configured to selectively engage said outer surface of said cover.

11. The constant velocity joint of claim 10, wherein said inner umbrella portion defines an inner lip.

12. The constant velocity joint of claim 10, wherein at least one of said inner umbrella portion and said outer umbrella portion at least partially prevents grease from flowing through said bore.

13. The constant velocity joint of claim 10, further comprising at least one foot portion disposed on said outer umbrella portion, said foot portion operable to space said outer umbrella portion away from said outer surface to define said second gap.

14. The constant velocity joint of claim 10, wherein said body has a maximum diameter defining a clearance fit with the bore.

15. The constant velocity joint of claim 10, wherein said body defines at least one channel disposed between said joint chamber and the external atmosphere.

16. The constant velocity joint of claim 10, wherein said inner umbrella portion is disposed within said joint chamber.

17. The constant velocity joint of claim 10, wherein said outer umbrella portion is disposed outside said joint chamber.

18. The constant velocity joint of claim 10, wherein said outer sealing lip is configured to engage said outer surface of said cover about substantially an entire portion of said periphery of said outer umbrella portion.

* * * * *